(12) United States Patent
Sand et al.

(10) Patent No.: US 9,667,692 B2
(45) Date of Patent: May 30, 2017

(54) SYSTEM AND METHOD FOR REMOTE ANALYSIS, REMOTE TRAINING OR REMOTE MAINTENANCE ON A MOBILE MACHINE

(71) Applicant: Reichhardt GmbH Steuerungstechnik, Hungen (DE)

(72) Inventors: Bastian Sand, Laubach (DE); Bastian Lansing, Reiskirchen (DE)

(73) Assignee: Reichhardt GmbH Steuerungstechnik, Hungen (DE)

( * ) Notice: Subject to any disclaimer, the term of this patent is extended or adjusted under 35 U.S.C. 154(b) by 0 days.

(21) Appl. No.: 15/211,221

(22) Filed: Jul. 15, 2016

(65) Prior Publication Data
US 2017/0034246 A1     Feb. 2, 2017

(30) Foreign Application Priority Data
Jul. 31, 2015   (DE) .................. 10 2015 112 613

(51) Int. Cl.
H04M 3/00      (2006.01)
H04L 29/08     (2006.01)
H04L 12/26     (2006.01)
H04W 8/22      (2009.01)

(52) U.S. Cl.
CPC .......... *H04L 67/025* (2013.01); *H04L 43/065* (2013.01); *H04W 8/22* (2013.01)

(58) Field of Classification Search
CPC ..... H04L 67/025; H04L 43/065; H04L 67/36; H04L 43/067; H04B 12/006; G03G 15/5079; G03G 15/5075; G06Q 10/00; G05B 15/02; H04W 8/22; H04W 10/00; G06F 11/27; H04N 1/00204; H04N 1/00244
USPC ............ 455/419; 345/3.3, 3.2, 2.2, 213, 698
See application file for complete search history.

(56) References Cited

U.S. PATENT DOCUMENTS

| 5,305,055 A * | 4/1994 | Ebner ................ G03G 15/5079 399/9 |
| 5,361,265 A * | 11/1994 | Weinberger ......... G06F 11/0733 399/8 |
| 6,948,175 B1 * | 9/2005 | Fong .................... G06F 11/3013 358/1.1 |

(Continued)

*Primary Examiner* — Mahendra Patel
(74) *Attorney, Agent, or Firm* — Collard & Roe, P.C.

(57) ABSTRACT

A system for remote analysis, remote training and/or remote maintenance on a mobile machine comprises a first display unit (10), command input means and a communication device which can be connected as required to the first display unit (10) and to a data network (15). The first communication device can be activated by a command input for bidirectional communication with a second communication device of a data network subscriber, wherein the first and second communication devices are designed to transmit the data displayed by the first display unit (10) to a second display unit (19) connected to the second communication device, and wherein the subscriber can transmit an instruction data sequence to the first display unit (10) via the data network (15) and said sequence can be displayed by said first display unit, wherein the reception and the storing of the instruction data sequence are designed such that an instruction of the instruction data sequence can only be carried out by actuating the command input means.

12 Claims, 1 Drawing Sheet

(56) References Cited

U.S. PATENT DOCUMENTS

| | | | | |
|---|---|---|---|---|
| 7,296,283 | B2* | 11/2007 | Hrastar | H04L 29/06 |
| | | | | 725/109 |
| 7,413,513 | B2* | 8/2008 | Nguyen | G07F 17/3223 |
| | | | | 463/39 |
| 9,098,114 | B2* | 8/2015 | Potter | G06F 3/017 |
| 2004/0030779 | A1* | 2/2004 | Motoyama | H04L 43/067 |
| | | | | 709/224 |
| 2004/0205375 | A1* | 10/2004 | Osawa | H04L 12/2697 |
| | | | | 714/4.1 |
| 2005/0083196 | A1* | 4/2005 | Furem | E02F 9/205 |
| | | | | 340/539.16 |
| 2005/0248792 | A1* | 11/2005 | Wright | H04N 1/00204 |
| | | | | 358/1.13 |
| 2007/0253380 | A1* | 11/2007 | Jollota | A61B 5/14532 |
| | | | | 370/338 |
| 2009/0157356 | A1* | 6/2009 | Jiang | G06F 11/27 |
| | | | | 702/183 |
| 2013/0064094 | A1* | 3/2013 | Nakao | H04W 40/02 |
| | | | | 370/238 |
| 2016/0006864 | A1* | 1/2016 | Park | G06F 17/30873 |
| | | | | 715/835 |

\* cited by examiner

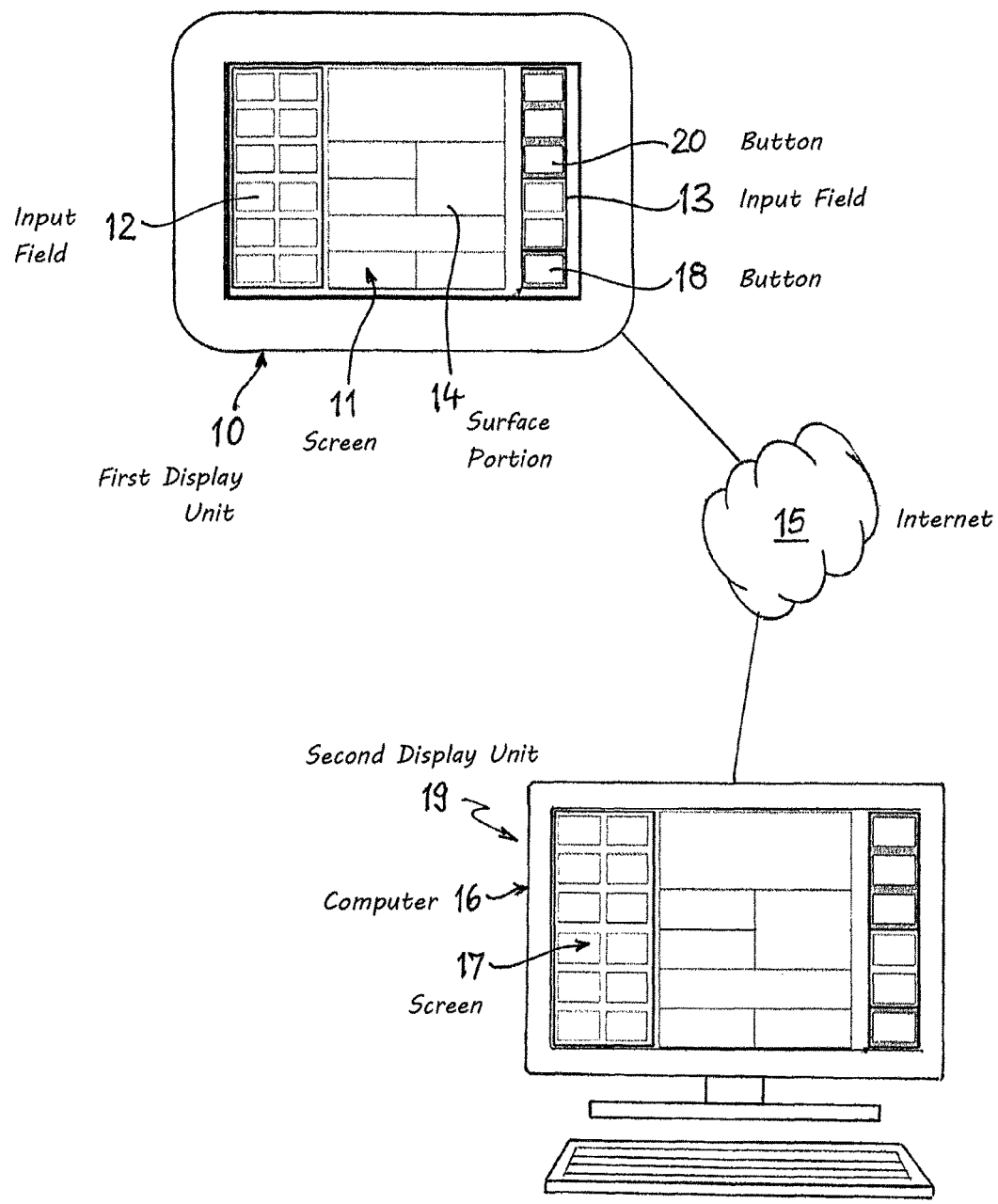

SYSTEM AND METHOD FOR REMOTE ANALYSIS, REMOTE TRAINING OR REMOTE MAINTENANCE ON A MOBILE MACHINE

CROSS REFERENCE TO RELATED APPLICATIONS

Applicants claim priority under 35 U.S.C. §119 of German Patent Application No. 10 2015 112 613.3 filed Jul. 31, 2015.

FIELD OF THE INVENTION

The invention relates to a system for remote analysis, remote training and/or remote maintenance on a mobile machine, comprising a programmable electronic controller, a user interface having a display unit and command input means, and a first communication device which can be connected to the display unit as required and can be wirelessly connected to a data network.

BACKGROUND OF THE INVENTION

Mobile machines within the meaning of the invention are motor-driven vehicles, construction machinery, machines for agriculture and forestry, and associated mounted implements. Nowadays, mobile machines often have a programmable electronic controller for controlling various drive and equipment components. The controller is connected to actuators and optionally to mounted implements via the machine's own network or control bus system and comprises a user interface, at which control commands and parameters can be input or selected. The user interface allows the input of target values for specific parameters and has a display unit on which the input target values, the machine's working parameters and functional signals measured by sensors, and other information, can be graphically displayed. The display unit is also often provided with a touchscreen function which is used for inputting different parameters and for carrying out actions. Control bus systems and user interfaces according to ISO standard 11783 are often used in agricultural vehicles and mobile agricultural machines. A controller and display unit can be integrated in a single device.

In today's often high level of specialization and complicated design of mobile machines, the problem frequently occurs that faults or malfunctions need to be corrected or repairs need to be carried out at the operating site, which requires detailed information describing design features, functions and sources of error. Owing to hardware restrictions of the existing and standardized controllers and user interfaces, only very rudimentary information regarding the machine can be stored therein. A user of the machine is therefore generally dependent on printed manuals with all the advantages and disadvantages thereof. For telephone customer support, the customer must first know and relay certain parameters such as serial number, version number, manufacturing date etc. Due to the often long columns of numbers, this requires a lot of time, which is often not available in critical situations such as during harvesting. Problems or faults can arise even when setting up or programming the machine control for carrying out certain jobs, and this requires the support of an expert or service adviser. Therefore, when such problems occur, it is necessary to help the operator of a machine in as short a time as possible, in order to prevent delays and longer outage times.

SUMMARY OF THE INVENTION

The object of the invention is that of providing a system which makes it possible to quickly and reliably provide the user or operator of a mobile machine of the mentioned type with information for general assistance, for remedying a fault or for repair or maintenance at the operating site.

According to the invention, the object is accomplished by a system for remote analysis, remote training and/or remote maintenance on a mobile machine, comprising a programmable electronic controller, a user interface having a first display unit and command input means, and a communication device which can be connected to the first display unit as required and can be connected wirelessly and/or via a cable to a data network, wherein the first communication device can be activated by a command input for bidirectional communication with a second communication device of a data network subscriber, wherein the first and second communication devices are designed to transmit the data displayed by the first display unit to a second display unit connected to the second communication device, and wherein the subscriber can transmit an instruction data sequence to the first display unit via the data network and said sequence can be displayed by said first display unit, wherein the reception and the storing of the instruction data sequence are designed such that an instruction of the instruction data sequence can only be carried out by actuating the command input means.

According to the invention, the object is further accomplished by a method for remote analysis, remote training and/or remote maintenance on a mobile machine comprising a programmable electronic controller, a user interface having a first display unit and command input means, and a communication device which can be connected to the first display unit as required and can be connected wirelessly and/or via a cable to a data network, wherein the first communication device can be activated by a command input for bidirectional communication with a second communication device of a subscriber of the data network, and the data displayed by the first display unit are transmitted to a second display unit connected to the second communication device, wherein an instruction data sequence can be generated by the subscriber on the basis of the data displayed by the second display unit and transmitted to the first display unit via the data network and displayed by said first display unit, wherein the instruction data sequence is received and stored at the first display unit such that an instruction of the instruction data sequence can only be carried out by actuating the command input means.

The first communication device can be activated by actuating the command input means and thus enabled to carry out bidirectional communication with a second communication device of a data network subscriber. The first and second communication devices are designed to transmit, during the communication, the data displayed by the first display unit to a second display unit connected to the second communication device, and to transmit an instruction data sequence generated by the subscriber on the basis of the data displayed by second display unit via the data network to the first display unit, wherein the reception and the storing of the instruction sequence are designed such that the instruction sequence can be displayed by the first display unit, but an instruction can only be carried out by actuating the command input means.

According to the invention, the subscriber can be a computer, in particular a server, and/or an expert. The data network is preferably the Internet and/or an intranet. The communication is preferably carried out via a web browser.

The system and the method according to the invention make it possible for the operator of a correspondingly equipped machine, in particular an agricultural machine, to communicate, when there is a problem, via the communication device and the data network with a service adviser at a remote location, such that both the operator and the service adviser can observe the data displayed on the screen of the display unit of the agricultural machine substantially simultaneously. The service adviser can thus observe and monitor, on his own screen, the status displayed on the screen at the machine and displayed actions of the operator, and transmit instructions for solving a problem to the operator, which instructions are in turn displayed to the operator on his own screen.

In this way, errors and misunderstandings, which can arise when exchanging information by telephone, are prevented, and all the information that is available on the display unit of the machine is made available to the service adviser for his analysis.

The instruction data sequences occur in the form and language specified by the design of the machine display unit and are adapted to the display and signal structure of the screen of the machine. The service adviser can therefore produce precise machine-related instructions and control these on his screen. The operator receives the instruction as a visual representation on his screen; text information can also be transmitted to him as required. Carrying out an instruction transmitted by the service adviser is left solely to the operator, since the service adviser can only communicate with the passive part of the display unit of the machine. Actively carrying out machine actions always requires a command input by the operator at the machine, since he alone can review the situation on site and judge whether machine actions are admissible. Remote control of the machine by the service adviser is not possible. Therefore, safety risks cannot arise through the remote access of the service adviser to the display unit of the machine.

By means of the method according to the invention, a farmer can be helped in a reliable and timely manner when problems arise in using or operating an agricultural machine. There are no start-up times for a service adviser and the outage time of the machine is considerably reduced. No long-winded explanations of the current content of the display unit are required and misunderstandings in transmitting information are prevented. The problem analysis can be reliably carried out shortly after the problem has arisen and thus makes a quick solution possible. The costs of solving problems are reduced.

The method furthermore has the advantage that the operator of the machine is himself lead step by step to the solution of a problem by the instructions of the service adviser via the screen, it also being required for the operator to perform the actions himself. The operator is thereby trained, his autonomous action promoting the learning effect.

The method provides safety for those completing the actions on site, because direct interaction with the machine from a remote location is not possible. The responsibility in carrying out machine functions lies solely with the operator on site. The communication with the service adviser and the access to the display data of the machine are possible from any Internet-enabled terminal. The purchase of additional hardware and expensive software is not required, since the system can generally be integrated into the existing machine equipment. The communication can be carried out via a web browser or specific programs which are stored in the first and second communication devices. In addition, the communication devices can be designed for the parallel transmission of acoustic information, in order to allow conversation between the operator and the service adviser. Alternatively, this can also take place using other telecommunication channels.

Within the meaning of the invention, a display unit is an electronic device which comprises a screen, a display or a monitor, and which can be used as display equipment or peripheral equipment. Control data of the machine and/or program data and instructions for carrying out jobs can be displayed by the display unit. A device for telecommunication can also be integrated in the display unit. The display unit can also be part of a mobile terminal, which is connected to the mobile machine by means of a data transmission device. The display unit can be designed as a touch-sensitive display unit, i.e. as a touchscreen. The user interface ("virtual terminal") which is optionally integrated in an agricultural machine and connected to the machine's own bus system can also be used as a system component or for carrying out the method. The essential advantage of a mobile terminal is that its use is not limited to the driver's cab.

DETAILED DESCRIPTION OF THE DRAWINGS

The invention is described in more detail in the following, on the basis of an embodiment which is shown in the drawing. The drawing shows a system comprising an electronic, digital display unit 10, which forms a user interface of an agricultural machine (not shown) and which can be connected to a controller of the machine by means of a bus system according to ISO standard 11783. The display unit 10 has a touch-sensitive screen 11 having selectable input fields 12, 13 for editing values and for selecting work symbols displayed in the fields, which symbols act as program-defined buttons. Vehicle data, sensor messages, operating states and other data can be displayed on a surface portion 14 of the screen which is not used for inputting commands.

A first communication device is implemented in the display unit 10 as a module which is designed to produce a wireless communication connection to a second communication device of a service adviser via the Internet 15. The second communication device can be a component of a computer 16 which, together with a screen 17, forms a second display unit 19 and is designed to display in the same way, on the screen 17, screen data sent by the display unit 10 and displayed on the screen 11.

The operator of the machine can activate such a communication connection by pressing a button 18 on the screen 11. The service adviser thus receives a signal which invites him to take part in the desired communication. To accept, he can send a response signal which appears on the screen 11. The operator can then transmit the displayed screen data by again pressing a button, e.g. button 18. Both screens 11, 17 now show the same thing, and therefore the service adviser can analyze the current operating situation displayed and give advice for solving existing problems.

The service adviser transmits his instructions in the form of instruction data sequences, which are displayed on both screens. Such an instruction can consist, for example, in highlighting a button 20 by flashing or changing its color, the activation of which button is a step for solving the problem. In addition, short passages of text can be displayed, which explain the steps or indicate effects to take into account or precautions to be taken. In addition, for the purpose of troubleshooting, acoustic information can be exchanged between the operator and the service adviser by means of the connected communication devices (voice over IP) or via other telecommunication channels.

Only the operator can carry out an instruction displayed by the service adviser. Said operator must decide whether he can take responsibility for the instructed action. The buttons displayed on the screen 17 of the service adviser are inactive.

What is claimed is:

1. System for remote analysis, remote training and/or remote maintenance on a mobile machine, comprising
   a mobile machine configured to perform a hazardous operation and comprising a programmable electronic controller, a user interface having a first display unit, and a command input device,
   a first communication device which can be connected to the first display unit as required and can be connected wirelessly and/or via a cable to a data network,
   a second display unit connected to a second communication device of a data network subscriber,
   wherein the first communication device is activated by a command input for bidirectional communication with the second communication device of the data network subscriber, wherein the first and second communication devices are designed to transmit the data displayed by the first display unit to the second display unit connected to the second communication device in such a manner that the second display unit displays the same data as the first display unit,
   wherein the subscriber generates and transmits an instruction data sequence to the first display unit via the data network, wherein said instruction data sequence is displayed by said first and second display units, wherein the reception and the storing of the instruction data sequence are designed such that an instruction of the instruction data sequence can only be carried out by actuating the command input device by an operator at the mobile machine, and
   wherein, for troubleshooting, the first communication device and the second communication device are configured to transmit, in parallel with each other, acoustic information between the operator and a service adviser at the second communication device.

2. System according to claim 1, wherein the subscriber is a computer, in particular a server, and/or an expert.

3. System according to claim 1, wherein the data network is the Internet or an intranet and the communication is carried out via a web browser.

4. System according to claim 1, wherein the communication is carried out via specific programs which are stored in the first and second communication devices.

5. System according to claim 1, wherein the first display unit is a component of a mobile telecommunication device which is connected to the controller or the first display unit of the mobile machine via a wireless and/or cable connection for data transmission.

6. Method for remote analysis, remote training and/or remote maintenance on a mobile machine comprising
   providing a mobile machine configured to perform a hazardous operation and comprising a programmable electronic controller, a user interface having a first display unit and a command input device,
   providing a first communication device connected to the first display unit and connected wirelessly and/or via a cable to a data network, and
   providing a second display unit connected to a second communication device of a data network subscriber,
   activating the first communication device by a command input for bidirectional communication with the second communication device of the subscriber of the data network, and transmitting the data displayed by the first display unit to the second display unit connected to the second communication device in such a manner that the second display unit displays the same data as the first display unit,
   generating an instruction data sequence by the subscriber on the basis of the data displayed by the second display unit and transmitting the instruction data sequence to the first display unit via the data network and displaying the instruction data sequence by said first and second display units, and
   receiving and storing the instruction data sequence at the first display unit such that an instruction of the instruction data sequence can only be carried out by actuating the command input device by an operator at the mobile machine,
   wherein, for troubleshooting, the first communication device and the second communication device exchange acoustic information with each other between the operator at the first communication device and a service adviser at the second communication device.

7. Method according to claim 6, wherein further acoustic information is exchanged between the operator and the service adviser via other telecommunication channels.

8. Method according to claim 6, wherein the instruction data sequence occurs in the form and language specified by the design of the first or second display unit.

9. Method according to claim 6, wherein the service adviser can only communicate with a passive part of the first or second display unit of the mobile machine.

10. Method according to claim 6, wherein actively carrying out machine actions always requires a command input by the operator at the mobile machine.

11. Method according to claim 6, wherein remote control of the mobile machine by the service adviser is not enabled.

12. Method according to claim 6, wherein the instruction transmitted comprises highlighting a button by flashing or changing color of the button or displaying passages of text.

* * * * *